United States Patent
Luettgen et al.

(10) Patent No.: US 6,626,210 B2
(45) Date of Patent: Sep. 30, 2003

(54) FLEXIBLE ARM ASSEMBLY

(75) Inventors: Harold A. Luettgen, Windsor, CO (US); Michael Cammack, Fort Collins, CO (US)

(73) Assignee: Water Pik, Inc., Fort Collins, CO (US)

(*) Notice: Subject to any disclaimer, the term of this patent is extended or adjusted under 35 U.S.C. 154(b) by 0 days.

(21) Appl. No.: 10/044,508

(22) Filed: Jan. 11, 2002

(65) Prior Publication Data

US 2002/0117229 A1 Aug. 29, 2002

Related U.S. Application Data

(60) Provisional application No. 60/261,530, filed on Jan. 12, 2001.

(51) Int. Cl.[7] .................................................. F16L 27/04
(52) U.S. Cl. .................................. 138/DIG. 8; 138/120; 138/155; 285/264
(58) Field of Search .............................. 138/120, 155, 138/110, DIG. 8; 285/264, 261, 166, 184

(56) References Cited

U.S. PATENT DOCUMENTS

| | | |
|---|---|---|
| 203,094 A | 4/1878 | Wakeman |
| 428,023 A | 5/1890 | Schoff |
| 445,250 A | 1/1891 | Lawless |
| 486,986 A | 11/1892 | Schinke |
| 566,410 A | 8/1896 | Schinke |
| 570,405 A | 10/1896 | Jerguson et al. |
| 800,802 A | 10/1905 | Franquist |
| 832,523 A | 10/1906 | Andersson |
| 854,094 A | 5/1907 | Klein |
| 926,929 A | 7/1909 | Dusseau |
| 1,001,842 A | 8/1911 | Greenfield |
| 1,003,037 A | 9/1911 | Crowe |
| 1,018,143 A | 2/1912 | Vissering |
| 1,217,254 A | 2/1917 | Winslow |
| 1,218,895 A | 3/1917 | Porter |
| 1,255,577 A | 2/1918 | Berry |
| 1,260,181 A | 3/1918 | Garnero |
| 1,276,117 A | 8/1918 | Riebe |
| 1,327,428 A | 1/1920 | Gregory |
| 1,451,800 A | 4/1923 | Agner |
| 1,469,528 A | 10/1923 | Owens |
| 1,500,921 A | 7/1924 | Bramson et al. |
| 1,560,789 A | 11/1925 | Johnson et al. |
| 1,597,477 A | 8/1926 | Panhorst |
| 1,692,394 A | 11/1928 | Sundh |
| 1,695,263 A | 12/1928 | Jacques |
| 1,724,147 A | 8/1929 | Jacques |
| 1,736,160 A | 11/1929 | Jonsson |
| 1,754,127 A | 4/1930 | Srulowitz |
| 1,758,115 A | 5/1930 | Kelly |
| 1,778,658 A | 10/1930 | Baker |
| 1,821,274 A | 9/1931 | Plummer |
| 1,906,575 A | 5/1933 | Goeriz |
| 2,024,930 A | 8/1935 | Judell |
| 2,044,445 A | 6/1936 | Price et al. |
| 2,177,152 A | 5/1938 | Crosti |
| 2,196,783 A | 4/1940 | Shook |
| 2,197,667 A | 4/1940 | Shook |

(List continued on next page.)

FOREIGN PATENT DOCUMENTS

| | | |
|---|---|---|
| CA | 659510 | 3/1963 |
| DE | 352813 | 5/1922 |
| DE | 2360534 | 6/1974 |
| DE | 2806093 | 8/1979 |

(List continued on next page.)

Primary Examiner—Patrick Brinson
(74) Attorney, Agent, or Firm—Dorsey & Whitney LLP

(57) ABSTRACT

A bead and interconnecting bead structure for use in a flexible arm assembly having improved interface characteristics allowing for simple, quiet adjustment of the structure in three dimensions, while simultaneously increasing the weight of object the arm assembly can support. The interface characteristics are improved by utilizing two different materials at the area of contact between two adjacent beads.

22 Claims, 9 Drawing Sheets

U.S. PATENT DOCUMENTS

| | | | |
|---|---|---|---|
| 2,268,263 A | 5/1941 | Newell et al. | |
| 2,342,757 A | 2/1944 | Roser | |
| D147,258 S | 8/1947 | Becker | |
| D152,584 S | 2/1949 | Becker | |
| 2,467,954 A | 4/1949 | Becker | |
| 2,546,348 A | 3/1951 | Schuman | |
| 2,664,271 A | 12/1951 | Arutunoff | |
| 2,584,129 A | 1/1952 | Muldoon | |
| D166,073 S | 3/1952 | Dunkelberger | |
| 2,648,762 A | 8/1953 | Dunkelberger | |
| 2,676,806 A | 4/1954 | Bachman | |
| 2,679,575 A | 5/1954 | Haberstump | |
| 2,680,358 A | 6/1954 | Zublin | |
| 2,759,765 A | 8/1956 | Pawley | |
| 2,776,168 A | 1/1957 | Schweda | |
| 2,873,999 A | 2/1959 | Webb | |
| 2,931,672 A | 4/1960 | Merritt et al. | |
| 3,032,357 A | 5/1960 | Shames et al. | |
| 2,966,311 A | 12/1960 | Davis | |
| D190,295 S | 5/1961 | Becker | |
| D192,935 S | 5/1962 | Becker | |
| 3,034,809 A | 5/1962 | Greenberg | |
| 3,103,723 A | 9/1963 | Becker | |
| 3,111,277 A | 11/1963 | Grimsley | |
| 3,143,857 A | 8/1964 | Eaton | |
| 3,196,463 A | 7/1965 | Farneth | |
| 3,266,059 A | 8/1966 | Stelle | |
| 3,306,634 A | 2/1967 | Groves, et al. | |
| 3,329,967 A | 7/1967 | Martinez et al. | |
| 3,389,925 A | 6/1968 | Gottschald | |
| 3,393,311 A | 7/1968 | Dahl | |
| 3,393,312 A | 7/1968 | Dahl | |
| 3,492,029 A | 1/1970 | French et al. | |
| 3,546,961 A | 12/1970 | Marton | |
| 3,565,116 A | 2/1971 | Gabin | |
| 3,584,822 A | 6/1971 | Oram | |
| 3,612,577 A | 10/1971 | Pope | |
| 3,641,333 A | 2/1972 | Gendron | |
| 3,663,044 A | 5/1972 | Contreras et al. | |
| 3,669,470 A | 6/1972 | Deurloo | |
| 3,685,745 A | 8/1972 | Peschcke-koedt | |
| 3,731,084 A | 5/1973 | Trevorrow | |
| 3,754,779 A | 8/1973 | Peress | |
| 3,860,271 A | 1/1975 | Rodgers | |
| 3,861,719 A | 1/1975 | Hand | |
| 3,869,151 A | 3/1975 | Fletcher et al. | |
| 3,910,277 A | 10/1975 | Zimmer | |
| D237,708 S | 11/1975 | Grohe | |
| 3,929,164 A | 12/1975 | Richter | |
| D240,322 S | 6/1976 | Staub | |
| 4,005,880 A | 2/1977 | Anderson et al. | |
| 4,006,920 A | 2/1977 | Sadler et al. | |
| 4,023,782 A | 5/1977 | Eifer | |
| 4,045,054 A | 8/1977 | Arnold | |
| D249,356 S | 9/1978 | Nagy | |
| 4,162,801 A | 7/1979 | Kresky et al. | |
| 4,243,253 A | 1/1981 | Rogers, Jr. | |
| 4,258,414 A | 3/1981 | Sokol | |
| 4,274,400 A | 6/1981 | Baus | |
| 4,282,612 A | 8/1981 | King | |
| D268,442 S | 3/1983 | Darmon | |
| 4,383,554 A | 5/1983 | Merriman | |
| 4,396,797 A | 8/1983 | Sakuragi et al. | |
| 4,425,965 A | 1/1984 | Bayh, III et al. | |
| 4,465,308 A | 8/1984 | Martini | |
| 4,495,550 A | 1/1985 | Visciano | |
| 4,540,202 A | 9/1985 | Amphoux et al. | |
| 4,545,081 A | 10/1985 | Nestor et al. | |
| 4,553,775 A | 11/1985 | Halling | |
| D281,820 S | 12/1985 | Oba et al. | |
| 4,568,216 A | * 2/1986 | Mizusawa et al. | 403/143 |
| 4,571,003 A | 2/1986 | Roling et al. | |
| D283,645 S | 4/1986 | Tanaka | |
| 4,643,463 A | 2/1987 | Halling et al. | |
| 4,645,244 A | 2/1987 | Curtis | |
| 4,652,025 A | 3/1987 | Conroy, Sr. | |
| 4,669,757 A | 6/1987 | Bartholomew | |
| 4,683,917 A | 8/1987 | Bartholomew | |
| 4,707,770 A | * 11/1987 | Van Duyn | 362/528 |
| 4,722,029 A | * 1/1988 | Ahle et al. | 362/528 |
| 4,733,337 A | 3/1988 | Bieberstein | |
| 4,739,801 A | 4/1988 | Kimura et al. | |
| 4,709,294 A | 12/1988 | Allred, III et al. | |
| 4,809,369 A | 3/1989 | Bowden | |
| 4,839,599 A | 6/1989 | Fischer | |
| 4,842,059 A | 6/1989 | Tomek | |
| D302,325 S | 7/1989 | Charet et al. | |
| 4,850,616 A | 7/1989 | Pava | |
| 4,856,822 A | 8/1989 | Parker | |
| 4,865,362 A | 9/1989 | Holden | |
| 4,871,196 A | 10/1989 | Kingsford | |
| D306,351 S | 2/1990 | Charet et al. | |
| 4,901,927 A | 2/1990 | Valdivia | |
| 4,903,178 A | 2/1990 | Englot et al. | |
| 4,907,137 A | 3/1990 | Schladitz et al. | |
| 4,946,202 A | 8/1990 | Perricone | |
| 4,951,329 A | 8/1990 | Shaw | |
| 4,959,758 A | * 9/1990 | Filosa et al. | 362/528 |
| 4,964,573 A | 10/1990 | Lipski | |
| 4,972,048 A | 11/1990 | Martin | |
| 4,975,123 A | * 12/1990 | Gray | 136/230 |
| D314,246 S | 1/1991 | Bache | |
| 5,022,103 A | 6/1991 | Faist | |
| 5,032,015 A | 7/1991 | Christianson | |
| 5,033,528 A | 7/1991 | Volcani | |
| 5,046,764 A | 9/1991 | Kimura et al. | |
| D321,062 S | 10/1991 | Bonbright | |
| D322,681 S | 12/1991 | Yuen | |
| 5,086,878 A | 2/1992 | Swift | |
| 5,103,384 A | 4/1992 | Drohan | |
| 5,107,406 A | * 4/1992 | Sekido et al. | 362/528 |
| 5,134,251 A | 7/1992 | Martin | |
| D329,504 S | 9/1992 | Yuen | |
| 5,143,123 A | * 9/1992 | Richards et al. | 138/110 |
| 5,153,976 A | 10/1992 | Benchaar et al. | |
| 5,154,483 A | 10/1992 | Zeller | |
| 5,163,752 A | 11/1992 | Copeland et al. | |
| 5,197,767 A | 3/1993 | Kimura et al. | |
| 5,215,338 A | * 6/1993 | Kimura et al. | 138/120 |
| 5,220,697 A | 6/1993 | Birchfield | |
| D337,839 S | 7/1993 | Zeller | |
| D338,542 S | 8/1993 | Yuen | |
| 5,254,809 A | 10/1993 | Martin | |
| D341,220 S | 11/1993 | Eagan | |
| 5,263,646 A | 11/1993 | McCauley | |
| 5,265,833 A | 11/1993 | Heimann et al. | |
| 5,268,826 A | 12/1993 | Greene | |
| 5,276,596 A | 1/1994 | Krenzel | |
| 5,286,071 A | 2/1994 | Storage | |
| 5,288,110 A | 2/1994 | Allread | |
| D345,811 S | 4/1994 | Van Deursen et al. | |
| 5,333,787 A | 8/1994 | Smith et al. | |
| 5,340,165 A | 8/1994 | Sheppard | |
| 5,349,987 A | 9/1994 | Shieh | |
| 5,368,235 A | 11/1994 | Drozdoff et al. | |
| 5,369,556 A | 11/1994 | Zeller | |
| 5,370,427 A | 12/1994 | Hoelle et al. | |
| 5,385,500 A | 1/1995 | Schmidt | |
| D356,626 S | 3/1995 | Wang | |
| 5,398,977 A | 3/1995 | Berger et al. | |
| D361,399 S | 8/1995 | Carbone et al. | |

| | | | | | | |
|---|---|---|---|---|---|---|
| 5,449,206 A | * | 9/1995 | Lockwood ............... 138/120 | D373,649 S | 9/1996 | Carbone |
| D363,360 S | | 10/1995 | Santarsiero | D373,651 S | 9/1996 | Szymanski |
| 5,468,057 A | | 11/1995 | Megerle et al. | D373,652 S | 9/1996 | Kaiser |
| D364,935 S | | 12/1995 | deBlois | D374,297 S | 10/1996 | Kaiser |
| D365,625 S | | 12/1995 | Bova | D374,298 S | 10/1996 | Swyst |
| D365,646 S | | 12/1995 | deBlois | D374,299 S | 10/1996 | Carbone |
| D366,707 S | | 1/1996 | Kaiser | D374,493 S | 10/1996 | Szymanski |
| D366,708 S | | 1/1996 | Santarsiero | D374,494 S | 10/1996 | Santarsiero |
| D366,709 S | | 1/1996 | Szmanski | D374,732 S | 10/1996 | Kaiser |
| D366,710 S | | 1/1996 | Szymanski | D374,733 S | 10/1996 | Santasiero |
| 5,481,765 A | | 1/1996 | Wang | 5,567,115 A | 10/1996 | Carbone |
| D366,948 S | | 2/1996 | Carbone | D376,217 S | 12/1996 | Kaiser |
| D367,333 S | | 2/1996 | Swyst | D376,860 S | 12/1996 | Santarsiero |
| D367,934 S | | 3/1996 | Carbone | D376,861 S | 12/1996 | Johnstone et al. |
| D368,146 S | | 3/1996 | Carbone | D376,862 S | 12/1996 | Carbone |
| D368,317 S | | 3/1996 | Swyst | 5,624,074 A | 4/1997 | Parisi |
| D368,539 S | | 4/1996 | Carbone et al. | D379,404 S | 5/1997 | Spelts |
| D368,540 S | | 4/1996 | Santarsiero | D381,405 S | 7/1997 | Waidele et al. |
| D368,541 S | | 4/1996 | Kaiser et al. | 5,667,146 A | 9/1997 | Pimentel et al. |
| D368,542 S | | 4/1996 | deBlois et al. | 5,749,602 A | 5/1998 | Delaney et al. |
| D369,873 S | | 5/1996 | deBlois et al. | 5,778,939 A | * 7/1998 | Hok-Yin ............... 138/109 |
| D369,874 S | | 5/1996 | Santarsiero | 5,865,378 A | 2/1999 | Hollinshead et al. |
| D369,875 S | | 5/1996 | Carbone | 5,997,047 A | 12/1999 | Pimentel et al. |
| D370,277 S | | 5/1996 | Kaiser | 6,042,155 A | * 3/2000 | Lockwood ............... 138/120 |
| D370,278 S | | 5/1996 | Nolan | 6,164,569 A | 12/2000 | Hollinshead et al. |
| D370,279 S | | 5/1996 | deBlois | 6,164,570 A | 12/2000 | Smeltzer |
| D370,280 S | | 5/1996 | Kaiser | 6,199,729 B1 | * 3/2001 | Drzymkowski ............. 138/120 |
| D370,281 S | | 5/1996 | Johnstone et al. | | | |
| 5,517,392 A | | 5/1996 | Rousso et al. | FOREIGN PATENT DOCUMENTS | | |
| 5,521,803 A | | 5/1996 | Eckert et al. | | | |
| D370,542 S | | 6/1996 | Santarsiero | EP | 0 683 354 | 11/1995 |
| D370,735 S | | 6/1996 | deBlois | EP | 0687 851 | 12/1995 |
| D370,987 S | | 6/1996 | Santarsiero | EP | 0 695 907 | 2/1996 |
| D370,988 S | | 6/1996 | Santarsiero | EP | 0721 082 | 7/1996 |
| D371,448 S | | 7/1996 | Santarsiero | FR | 538538 | 6/1922 |
| D371,618 S | | 7/1996 | Nolan | FR | 2695452 | 3/1994 |
| D371,619 S | | 7/1996 | Szymanski | GB | 3314 | 12/1914 |
| D371,856 S | | 7/1996 | Carbone | GB | 129812 | 7/1919 |
| D372,318 S | | 7/1996 | Szymanski | GB | 204600 | 10/1923 |
| D372,319 S | | 7/1996 | Carbone | GB | 634483 | 3/1950 |
| 5,531,625 A | | 7/1996 | Zhong | GB | 971866 | 10/1964 |
| D372,548 S | | 8/1996 | Carbone | GB | 2156932 A | 10/1985 |
| D372,998 S | | 8/1996 | Carbone | GB | 10086 | 2/1988 |
| D373,210 S | | 8/1996 | Santarsiero | JP | 63-181459 | 11/1988 |
| D373,434 S | | 9/1996 | Nolan | JP | 2-78660 | 6/1990 |
| D373,435 S | | 9/1996 | Nolan | WO | WO 93/12894 | 7/1993 |
| D373,645 S | | 9/1996 | Johnstone et al. | WO | WO 93/25839 | 12/1993 |
| D373,646 S | | 9/1996 | Szymanski et al. | WO | WO 98/30336 | 7/1998 |
| D373,647 S | | 9/1996 | Kaiser | | | |
| D373,648 S | | 9/1996 | Kaiser | * cited by examiner | | |

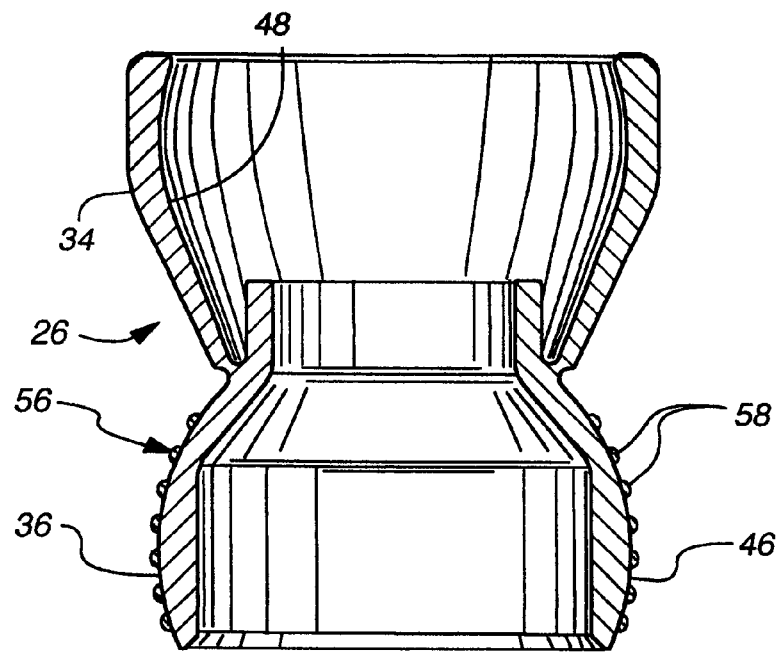
Fig. 7a
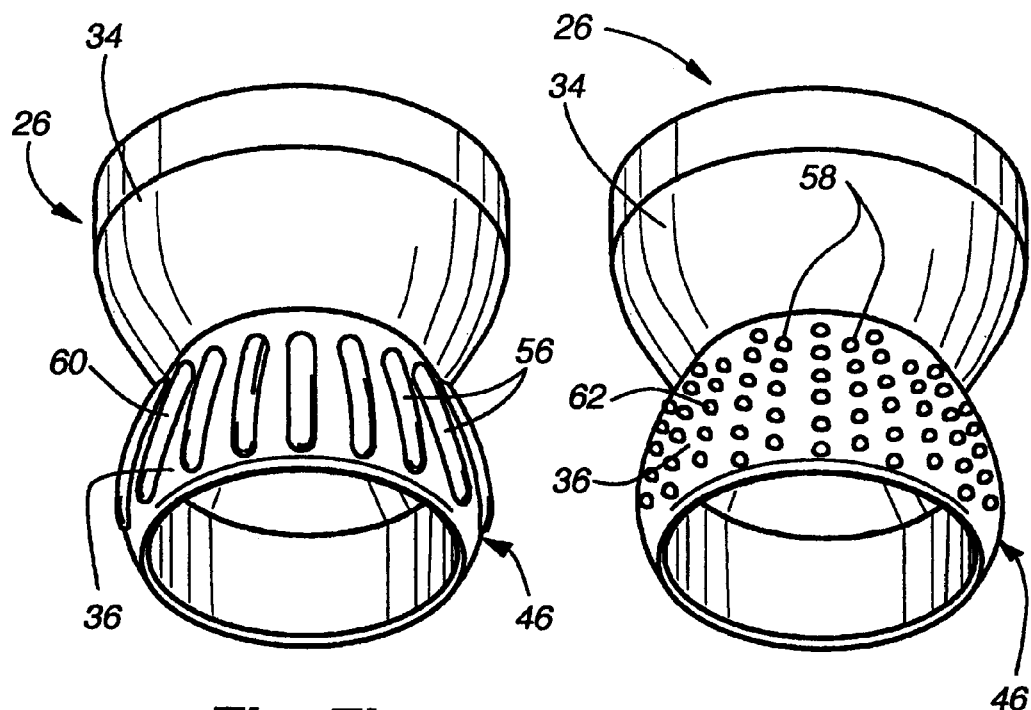
Fig. 7b  Fig. 7c

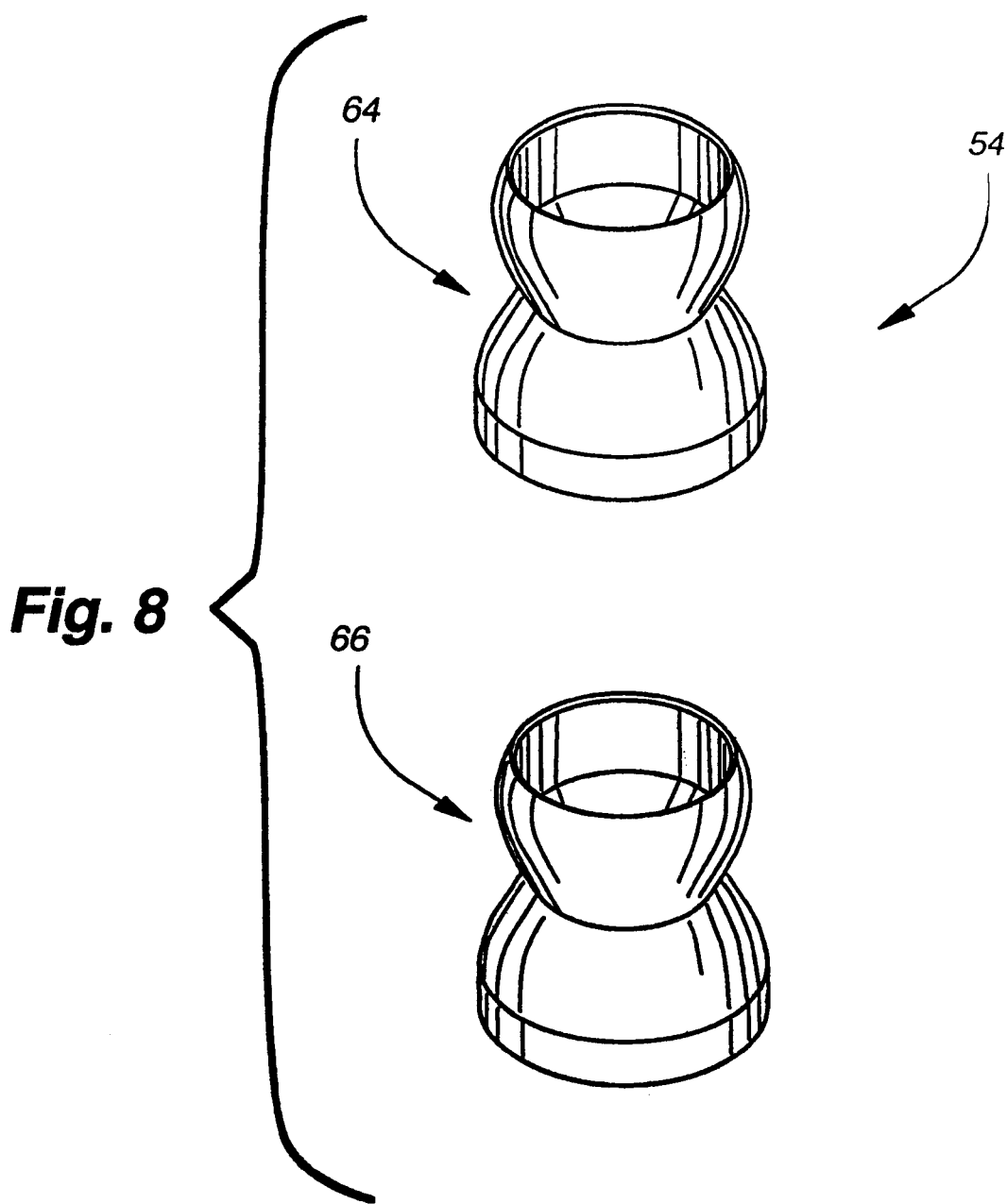

FLEXIBLE ARM ASSEMBLY

CROSS-REFERENCE TO RELATED APPLICATIONS

This application claims priority to the provisional application, Serial No. 60/261,530, filed on Jan. 12, 2001 entitled "Interconnecting Bead Structure Having Improved Interface Characteristics." The contents of this provisional application are hereby incorporated by reference as if fully disclosed herein.

FIELD OF THE INVENTION

This invention relates to a flexible arm assembly and more particularly to an interconnecting bead structure useful, for example, as a flexible shower arm assembly.

BACKGROUND OF THE INVENTION

Flexible arm assemblies, such as assemblies that allow for variable positioning of a showerhead in three dimensions, are known in the art. One such shower arm assembly utilizes beads having a ball and socket design in which the ball end of the bead is adapted to interconnect with the socket end of an adjacent bead.

This interconnecting ball and socket bead structure provides for adjustability in three dimensions, and also provides support for showerheads. The support for the showerhead results from the friction between the adjacent beads. A limitation of this design, and others, is the weight of the showerhead. With showerhead design constantly changing, it would be desirable to provide a flexible shower arm that was strong enough to support much heavier showerheads while still providing for simple adjustability by the user. One method of increasing the load the shower arm is capable of supporting is to increase the friction between the beads. Tightening the fit between the adjacent beads generally increases the friction. Unfortunately, however, tightening this fit can introduce an annoying "squeaking" noise resulting from the rubbing of the materials of the adjacent beads. This "squeaking" is unacceptable for commercially viable products and therefore is an unacceptable shortcoming inherent in current flexible shower arm designs.

Thus, there is a need in the art for an adjustable interconnecting bead structure that is capable of supporting heavier loads and that is easily adjustable and does not squeak while a user adjusts the structure to its desired position. More particularly, there is a need in the art for an adjustable arm assembly capable of supporting showerheads weighing about one pound or more. The present invention solves these needs.

SUMMARY OF THE INVENTION

The present invention in general terms concerns a bead assembly, or a plurality of beads, for an interconnecting bead structure, or flexible arm assembly. According to one embodiment, a flexible arm assembly is provided having a first bead having a first end and a second bead having a second end. The first end has an external surface and the second end of the second bead has an opening defining an internal wall, or recess, adapted to receive the first end of the first bead. An overmold surface is disposed between the external surface of the first bead and the internal wall of the second bead creating a friction relationship between the first bead and the second bead sufficient to maintain the flexible arm assembly in a fixed orientation. These beads may be connected in any combination to yield a complete interconnecting bead structure useful in various applications, including for example flexible shower arms and sink water faucets. The overmold surface covers substantially all of the area of contact between the first bead and the second bead. The overmold surface can also be in the form of at least one strip or at least one tab.

In another embodiment, an interconnecting bead unit is provided having a first bead made from a first material and a second bead made from a second material movably connected to the first bead. The interconnecting bead units may be connected in any combination to yield a complete flexible shower arm. The first material is generally different from the second material.

In another embodiment, a bead for a flexible arm assembly is provided a first end having an external surface and a second end having recess, or opening, adapted to receive the first end of the bead. The first end is made from a first material and the second end is made from a second material. These beads may be connected in any combination to yield a complete flexible arm assembly.

Other aspects, features and details of the present invention can be more completely understood by reference to the following detailed description of the preferred embodiments, in conjunction with the drawings, and from the appended claims.

BRIEF DESCRIPTION OF THE DRAWINGS

FIG. 7a is a section view of a bead, similar to that shown in FIG. 6, having horizontal overmold strips in accordance with another embodiment of the present invention.

FIG. 7b is a bottom perspective view of a bead having axially aligned overmold strips in accordance with another embodiment of the present invention.

FIG. 7c is a bottom perspective view of a bead having an overmold surface comprised of dots in accordance with another embodiment of the present invention.

FIG. 8 is a bottom perspective view of interconnecting beads where two beads are made of separate materials in accordance with another embodiment of the present invention.

DETAILED DESCRIPTION OF THE INVENTION

Figure 1:
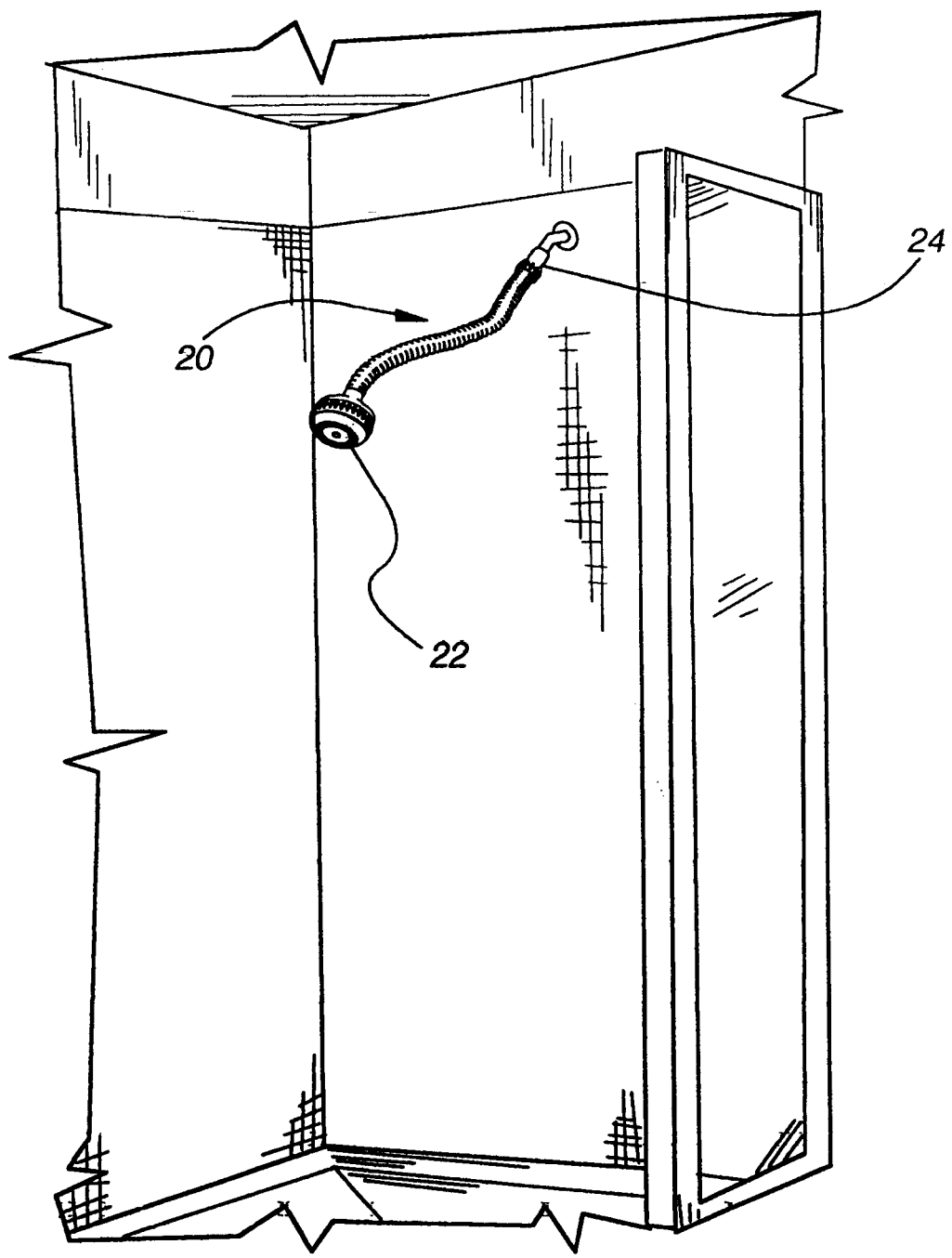
FIG. 1 is a perspective view of a shower stall having a flexible shower assembly incorporating one embodiment of the present invention.

In general, the present invention is directed to flexible arm assemblies 20 useful in connection with a water source to provide for semi-permanent adjustment of the direction of water flow from the water source. Typical uses include flexible shower arms 20 as shown in FIG. 1 in which a showerhead 22 is connected to the flexible arm 20, which is in turn connected to a water supply pipe 24. Although the embodiment of the present invention are described with respect to shower assemblies, it is to be understood that the flexible arm assembly 20 can be used in various applications where adjustability of the delivery of a water source is desirable, such as sink water faucets, bath tub faucets, drinking water faucets, etc.

Figure 2:
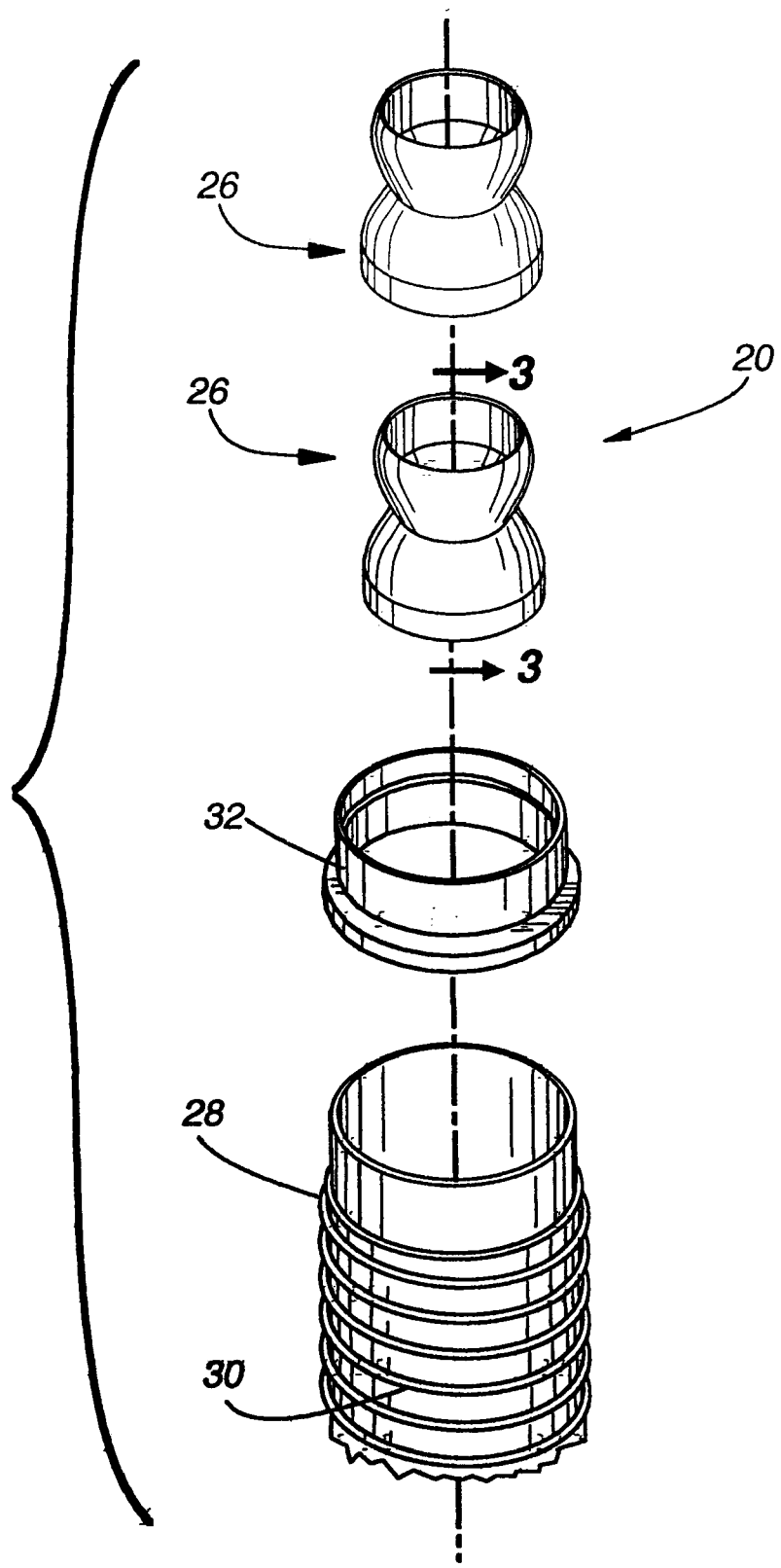
FIG. 2 is a partial exploded view of the flexible arm assembly and the protective sheath in accordance with one embodiment of the present invention.

Referring to FIG. 2, the flexible arm assembly 20 includes a plurality of beads 26 which are designed to be interconnected together. To protect the flexible arm assembly, a sheath 28 is provided that encompasses the length of the flexible shower arm 20 and extends from the shower pipe 24 to the base of the showerhead 22 and is attached at both ends to hold the sheath 28 in place. The sheath 28 protects the arm assembly 20 from moisture, dirt and other contaminants which may affect the performance of the flexible shower arm 20, particularly "squeaking." The sheath 28 has a helical coil 30 and moves separately from the beads 26 to allow it to bend with the reconfiguration of the arm 20, and to stretch axially to some extent. The sheath 28 is dimensioned to slide over the outside of the flexible arm assembly 20. A retainer 32 is also provided to facilitate attachment of the sheath 28 to the water supply pipe 24 and/or showerhead 22.

The flexible arm 20 is made of a plurality of beads 26 attached together. Each bead 26 is pivotable and movable with respect to each of the adjacent beads. The number of beads connected together determines the length of the flexible arm assembly 20. A more detailed description of a flexible shower arm, including its connection to a shower pipe 24 and a showerhead 22 is provided in U.S. Pat. No. 6,164,569 ("the '569 patent"), issuing on Dec. 26, 2000 to the assignee of this application. The contents of the '569 patent are hereby incorporated by reference herein in its entirety.

Figure 3:
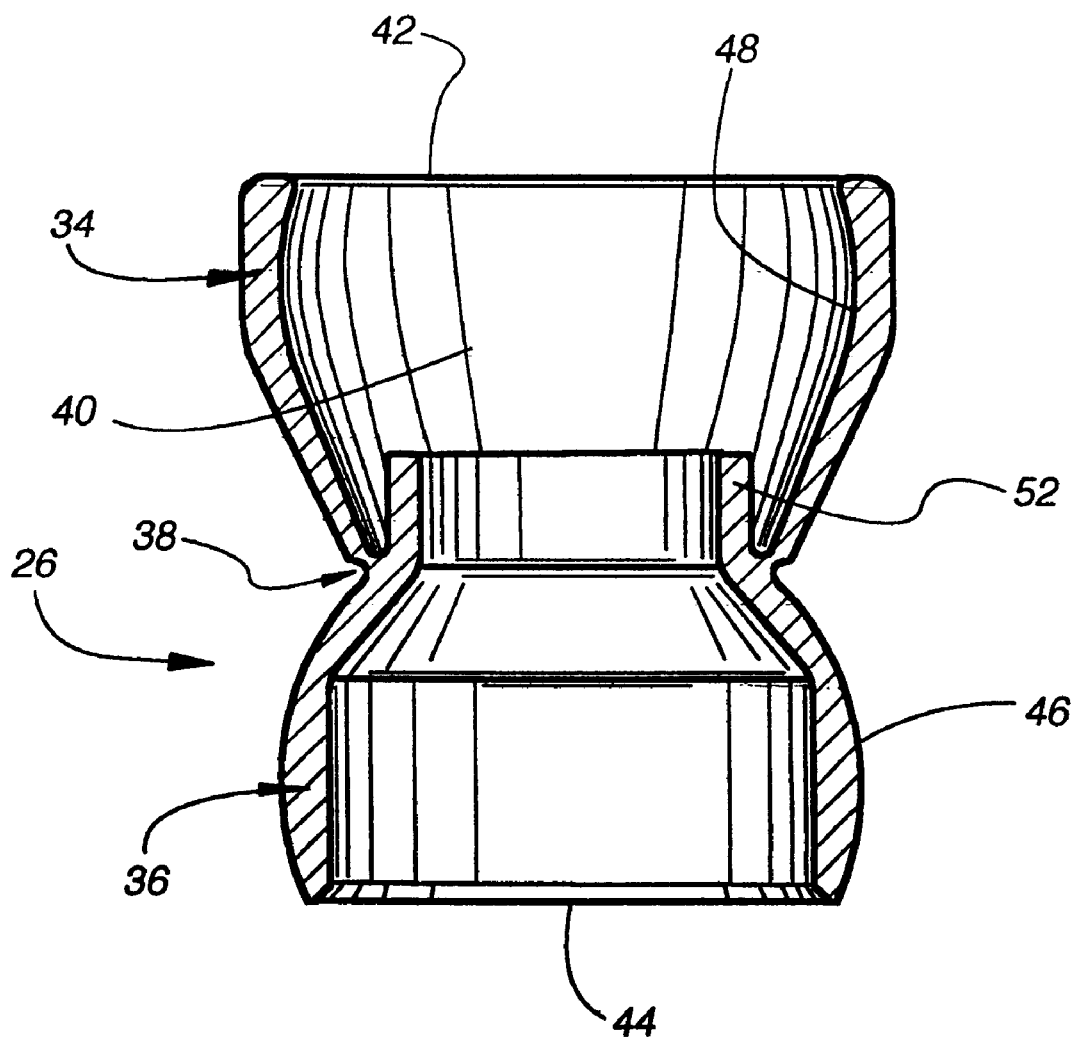
FIG. 3 is a section view taken along line 3—3 of FIG. 2, showing a bead in accordance with one embodiment of the present invention.

FIG. 3 shows an exemplary bead 26 in accordance with one embodiment of the present invention. Each bead has a larger end 34 and a smaller end 36, with a tapered neck area 38 defined between the two ends 34 and 36. Each bead 26 defines an internal cavity 40 extending therethrough, and when interconnected with other beads, forms a continuous internal conduit that extends along the entire length of the flexible arm assembly 20. The internal cavity 40 formed through the bead 26 defines a recess 42 at the larger end 34 of the bead 26 and an opening 44 at the smaller end 36 of the bead 26. The external surface 46 of the smaller end 36 of the bead 26 is substantially spherical in shape. Likewise, the internal wall 48 of the recess 42 in the larger end 34 is also substantially spherical in shape so that the smaller end 36 of a first bead may be received in the larger end 34 of a second bead in a friction-creating relationship to make the beads 26 stay in virtually any desired interconnected position relative to one another. Any number of beads 26 can be attached together in this manner.

Figure 4:
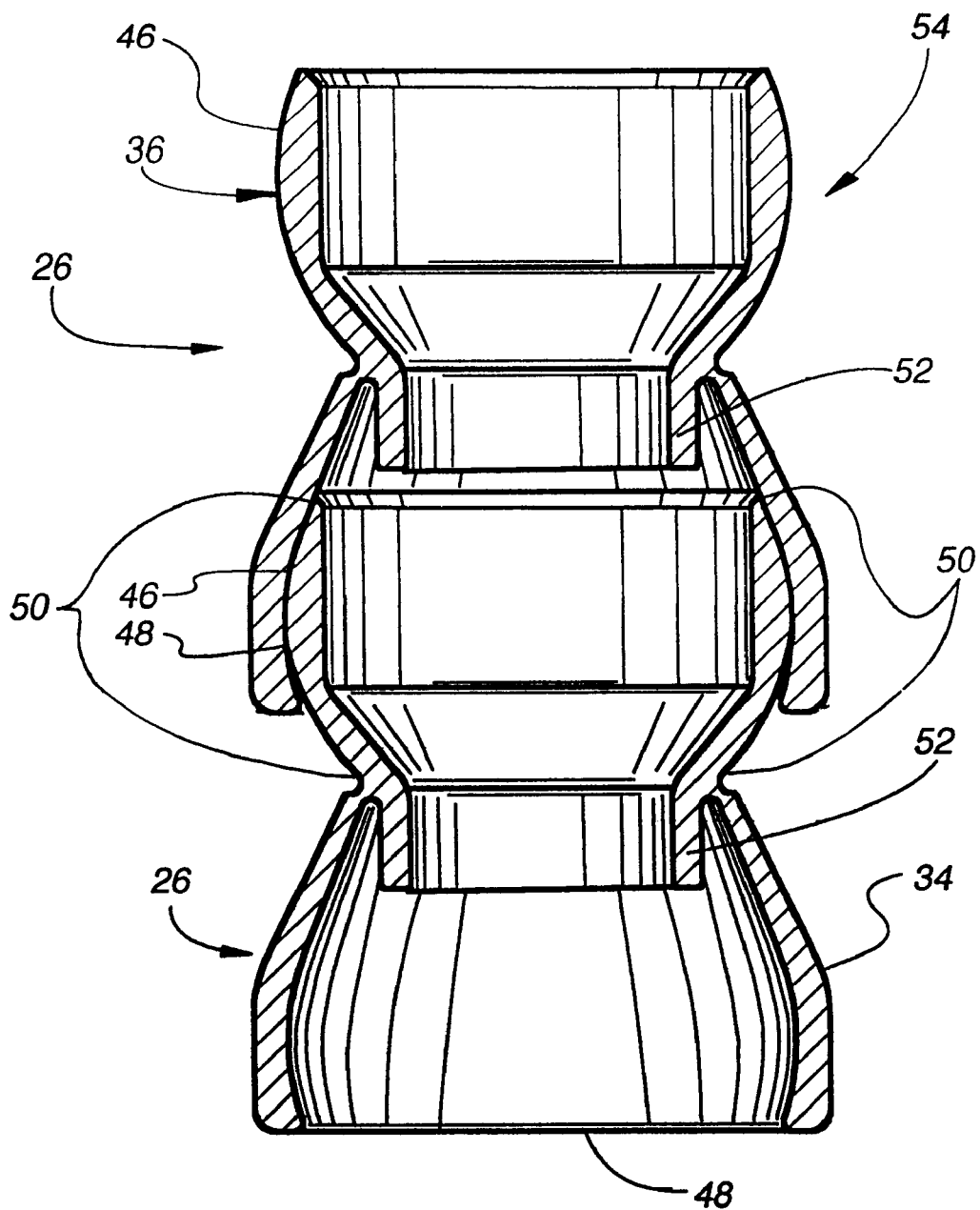
FIG. 4 is a section view of two beads, each similar to that shown in FIG. 3, interconnected to form an interconnected series of beads in accordance with one embodiment of the present invention.
Figure 5:
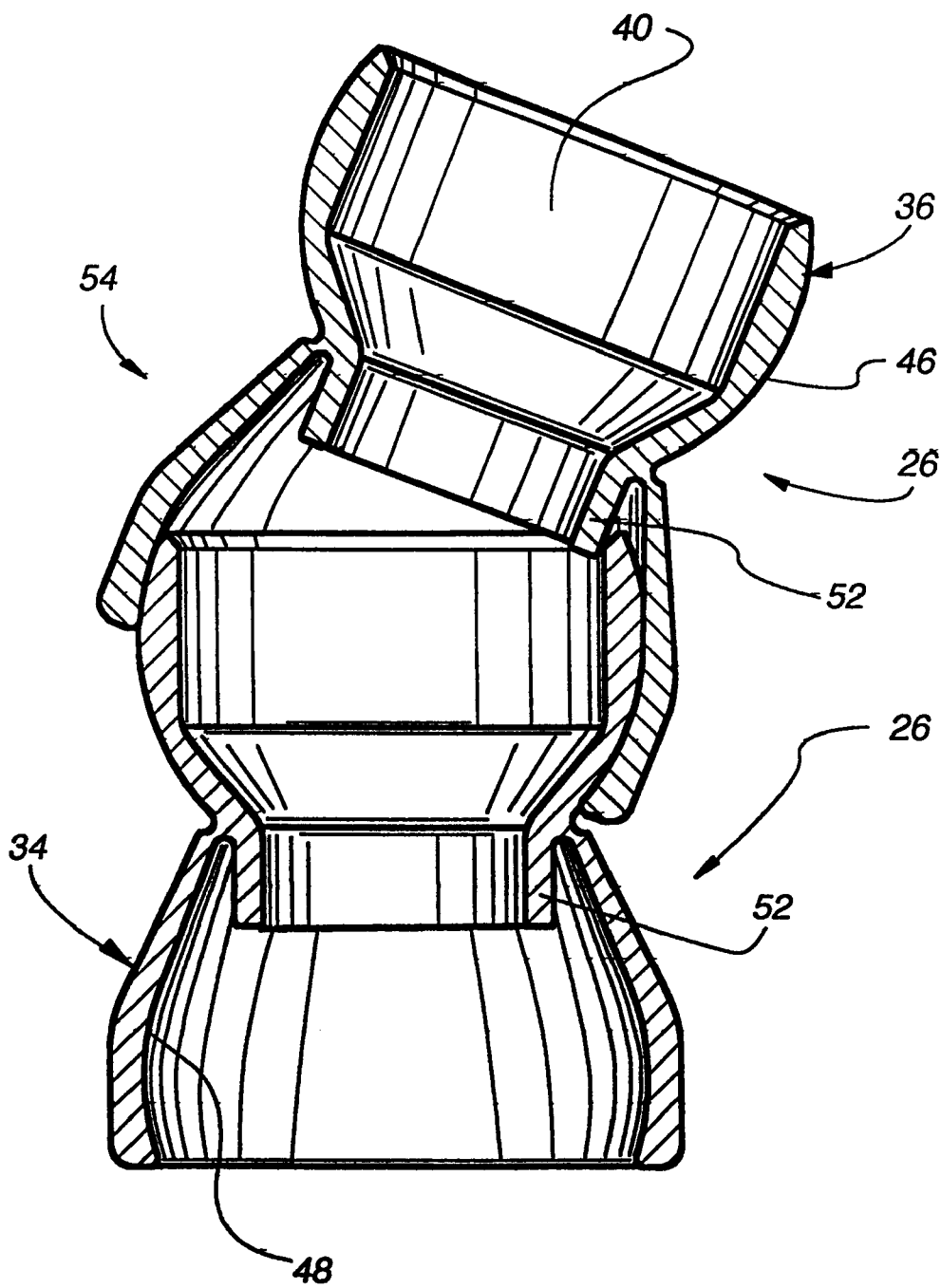
FIG. 5 is an interconnected series of beads in an angled orientation in accordance with one embodiment of the present invention.

While the embodiments shown in this application include corresponding spherical shaped ends, any corresponding shapes that create a frictional relationship between each adjacent, interconnected bead can be used. In any event, the result is a pivotable and movable joint formed between adjacent connected beads, having an area of contact 50 between two beads 26 as shown in FIG. 4. "Area of contact" for purposes of this application means all or part of the area of the external surface 46 of the smaller end 36 of one bead 26 that is actually, or potentially, in contact with the internal wall 48 of the recess 42 of the larger end 34 (in any relative orientation and or at any single relative orientation) of another bead 26 when two beads are interconnected. For example, in the situation where the external surface of the bead is substantially spherical, the area of contact 50 extends over the entire external surface (see FIGS. 4 and 6). Thus, when two beads are interconnected and adjusted to a position as shown in FIG. 5, the area of contact 50 can extend beyond the edge of the internal wall 48 of the recess 42. The area of contact 50 which creates the friction relationship is typically the majority of the surface area of the curved interface between the internal wall 48 of the larger end 34 and the external surface 46 of the smaller end 36 when two beads 26 are interconnected; however, it is possible because of construction tolerances or bead construction that the area of contact 50 between the beads 26 is less than the entire surface area of the interface between the interconnected beads.

In order to prevent the beads 26 from separating when they are pivoted too far in any direction, each bead is provided with a center lock ring 52 as shown in FIGS. 3 and 4. More details pertaining to this center lock ring 52 are discussed in U.S. Pat. No. 5,449,206. This feature is helpful to the performance of the flexible arm assembly 20 made of interconnected beads 26, but is not necessary for the practice of this invention.

Once two adjacent beads 26 are interconnected, an interconnecting bead unit 54 is formed. The interconnecting bead unit 54 may be two or more beads 26 connected together. The overall length of the flexible arm assembly 20 therefore depends on the number of interconnecting bead units 54 combined together. FIG. 5 shows a section of an interconnecting bead unit 54 in a shaped position.

The beads 26 are preferably formed by injection molding by methods that are known to those of ordinary skill in the art. As will be discussed below, the materials used can vary.

Referring back to FIG. 3, the shape of the cavity 40 formed in the large end 34 of the bead 26 is appropriately sized to tightly receive the smaller end 36 of an adjacent bead 26 such that the beads 26 can rotate and pivot with respect to one another under the force of the user. However, the fit is sufficiently tight to create adequate friction between the larger end 34 of a first bead 26 and the smaller end 36 of a second bead 26 to maintain the relative positions of the beads 26 once the flexible arm assembly 20 is shaped by a user. Friction can be increased by increasing the size of the smaller end 36 in relation to the larger end 34, or conversely, decreasing the size of the larger end 34 in relation to the smaller end 36. In either event, the result is a tighter fit between the beads 26, which subsequently allows for the arm assembly 20 to support objects, such as showerheads, with a greater weight. Unfortunately, simply increasing the amount of friction between adjacent beads 26 of the same material can introduce an extremely unpleasant "squeaking" to the arm assembly 20. This "squeaking" is undesirable for a viable commercial product. Additionally, there is a practical limit in which the friction cannot be increased. At some point the sizes of the external surface of the smaller end and the recess of the larger end so closely approach one another that the beads will not lock together. At this point, the beads may also cease to be adjustable by the ordinary force of a user.

The present invention contemplates utilizing two separate materials at the area of contact 50 between the larger end 34 of a bead 26 and the smaller end 36 of an alternate bead 26 (as shown in FIG. 4), to significantly reduce the annoying "squeaking" while simultaneously allowing for the adequate level of friction required for supporting heavier objects.

The different materials used for this purpose are typically selected based on the hardness characteristics of the materials. It is believed the interaction of a softer material with that of a harder material at the area of contact 50 helps to eliminate the "squeaking" problem. The materials may be separate thermoplastic materials (e.g., nylon and polyacetal), teflon-filled polyacetal and non-filled polyacetal, a thermoplastic material and a thermoplastic elastomeric material (i.e., polyacetal and rubber), a combination of different metals and plastics, a combination of metals, or any other suitable combination of materials having different hardness properties. For plastics the difference is often measured by determining a material's Shore "A" hardness. This concept may be implemented in numerous ways, several of which are described in more detail in the embodiments below. Where metal is used, the metal can be stainless steel, brass, or the like. The metal used can be an injection-moldable metal (such as in a powder form with a polymer carrier) so that bead structures can be formed. Alternatively, the bead structures can be machined.

Figure 6:
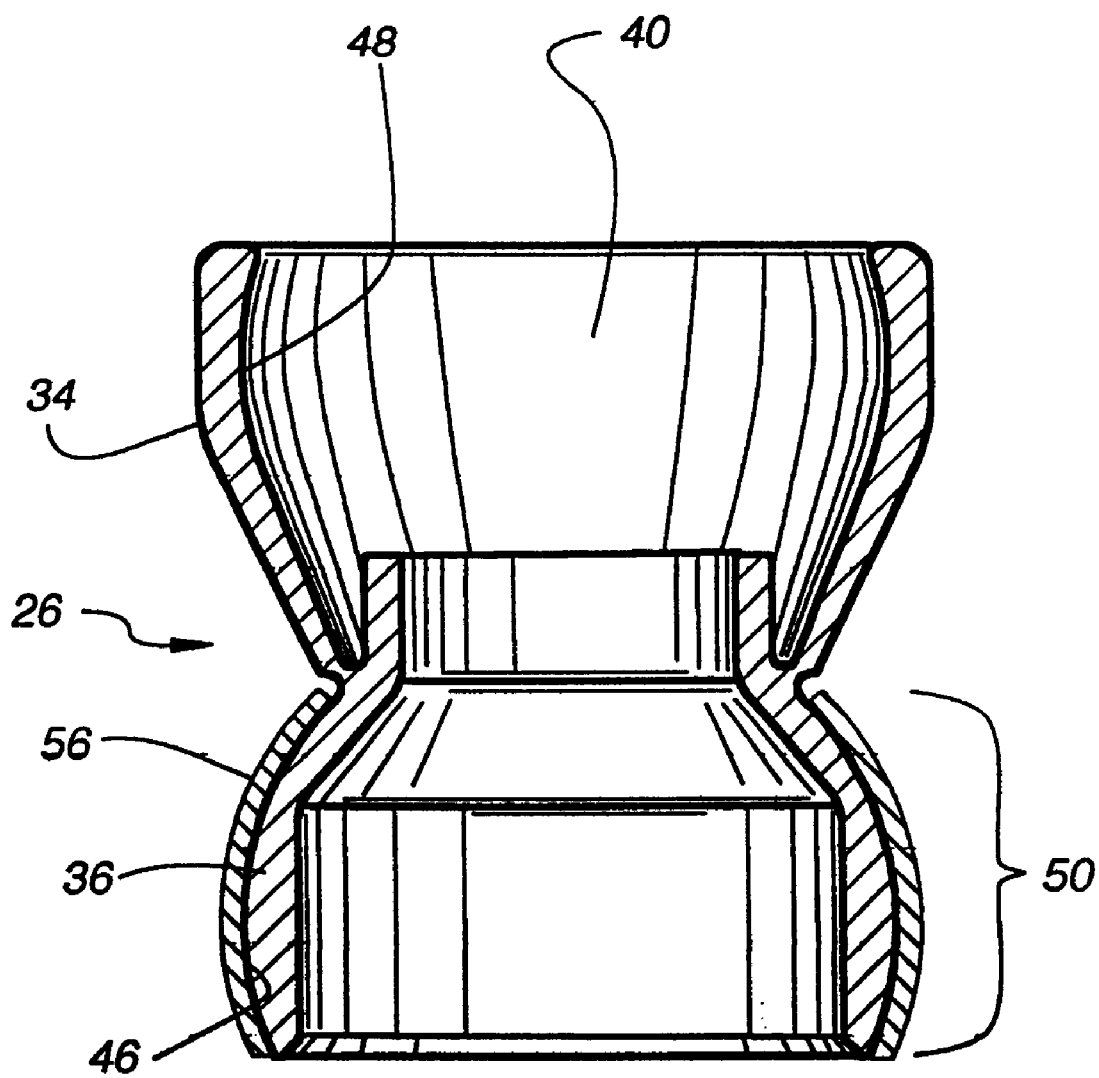
FIG. 6 is a section view, similar to that shown in FIG. 3, of a bead having an overmold surface in accordance with one embodiment of the present invention.

In accordance with one embodiment and as shown in FIG. 6, a bead 26 is provided having an overmold surface 56 disposed about the external surface 46 of the smaller end 36, at least on all or part of the contact surface 50. The material and/or the thickness of the overmold surface is selected to increase the amount of friction between the external surface 46 of the smaller end 36 (ball) and the internal surface 48 of the larger end 34 (socket) of an adjacent bead 26 when the two beads 26 are interconnected. Generally the thickness is in the range of 0.040" to 0.050". This overmold material is preferably a thermoplastic rubber. Thermoplastic rubbers include, for example, santoprene rubber and monoprene rubber or any suitable thermoplastic rubber with a Shore "A" hardness range of 40–90.

The overmold surface 56 need not completely surround the external surface 46 of the smaller end 36 (as shown in FIG. 6) but may also be disposed over a portion of the external surface 46 of the smaller end 36 in various configurations. The overmold surface 56 can be disposed over less than 75% of the external surface, or even less than 50% of the external surface. In any event, the overmold material and configuration should be selected to provide the strength necessary to support the desired object and allow for adjustment by the user without the unacceptable squeaking found in other designs.

Suitable configurations include strips that extend circumferentially around the surface of the bead 26 or that extend axially along the surface of the bead 26. The strips can be continuous or can have partial interruptions creating a dashed-line effect. The strips can extend in any configuration or any direction. The strips can extend in non-linear patterns, such as sinusoidal patterns. The overmold can also be composed of a number of polygonal or circular dots or tabs. FIGS. 7a–7c show exemplary configurations of the overmold surface 56. It is to be understood, however, that any configuration of overmold surface 56 is contemplated by this embodiment of the invention.

FIG. 7a is a section view of a bead 26 according to one embodiment having a larger end 34 and a smaller end 34 having an external surface 46. The external surface 46 has linear, circumferential strips around the surface of the bead 20 forming an overmold surface 56. The strips are continuous but can also be in the form of dashed lines or patterned lines. In this embodiment, the strips 58 may also be placed on the internal surface 48 of the larger end 34 as opposed to the external surface 46 of the smaller end 36.

FIG. 7b is a bottom perspective view of a bead 26 according to another embodiment having a larger end and a smaller end 36 having an external surface 46. The external surface 46 has axially extending strips 60 on the external surface 46 of the smaller end 36 forming an overmold surface 56. The axially extending strips 60 are continuous but can also be in the form of dashed lines or patterned lines. In this embodiment, the axially extending strips 60 may also be placed on the internal surface 48 of the larger end 34.

FIG. 7c is a bottom perspective view of a bead 26 according to another embodiment having a larger end 34 and a smaller end having an external surface 46. The external surface 46 has a plurality of polygonal shaped tabs 62 around the surface 46 of the smaller end 36 thereby creating an overmold surface 56. The tabs 62 can be applied to the smaller end 36 in any predetermined pattern, or in a random configuration. In this embodiment, the tabs 62 may also be placed on the internal surface 48 of the larger end 34.

The use of strips 58, 60, or tabs 62, as shown for example in FIGS. 7a–c, allows for the amount of friction at the area of contact 50 to be varied in accordance with strength requirements of a particular interconnecting bead structure 20. Preferably, the overmold surface 56 is the softer material; however, it may also be the harder material. As discussed with respect to FIGS. 7a–c, it is also contemplated that the overmold surface 56 can be disposed about the internal surface 48 of the larger end 34.

A bead 26 with an overmold surface 56 is preferably formed by "two shot" injection to molding. This "two shot" process is known to those of ordinary skill in the art.

In accordance with another embodiment as shown in FIG. 8, an "interconnecting bead unit" 54 is provided having at least two separate beads 64 and 66 constructed according to the structure described above and shown in FIG. 3, but where the first bead 64 is made of a first material such as polyacetal, nylon, teflon-filled polyacetal, metal, or any other suitable material, and a second bead 66, which is composed of a different second material with hardness properties different from the first material. If the bead unit 54 includes more than two beads, then each bead is made of a material different from the adjacent end. The second material may be polyacetal, nylon, teflon-filled polyacetal, metal or any other suitable material. In the case where both materials are plastics, it is preferred that the difference in measured Shore "A" hardness between the two materials is at least 5. The beads are then interconnected creating the interconnecting bead unit 54 such that the first material and second material alternate. These interconnecting bead units 54 then may be connected to other units 54 to provide a complete flexible arm assembly 20 capable of providing the desired strength and greatly reducing any "squeaking." Any number of materials may be selected for such units, so long as no two adjacent beads 26 within a flexible arm assembly 20 are made of the same material. In alternate embodiments, the beads 64 and 66 may be manufactured using a metal material and a thermoplastic material or two separate metal materials.

Figure 9:
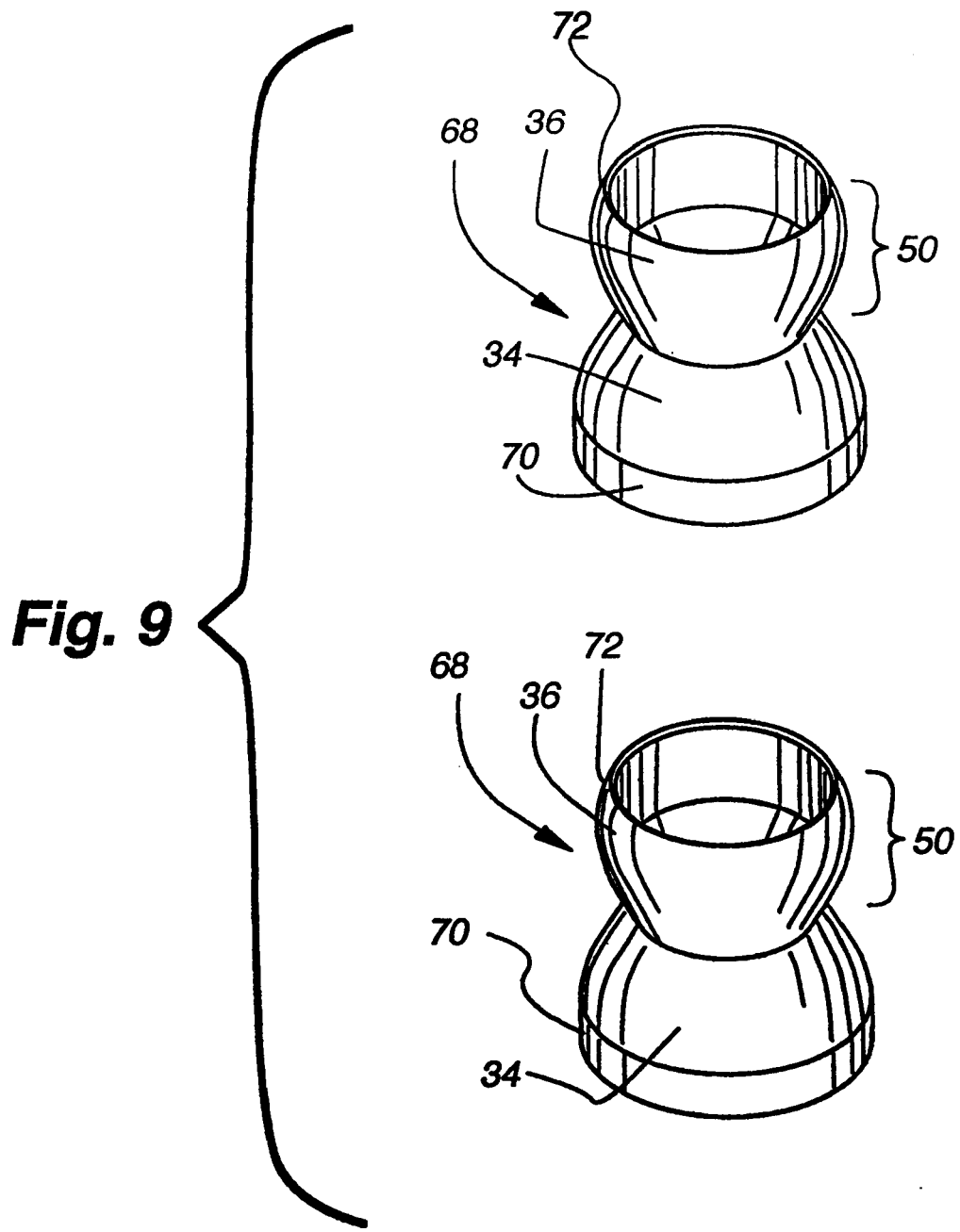
FIG. 9 is a bottom perspective view of interconnecting beads where each of the two beads has a larger end made of a first material and a smaller end made of a second material in accordance with one embodiment of the present invention.

In accordance with another embodiment, as shown in FIG. 9, there is provided a single bead 68 made of at least two separate materials 70 and 72. For instance, the larger end 34 of the bead 68 is made of a first material 70, and the smaller end 36 of the same bead is made of a second material 72. Thus, when multiple beads 68 are connected to one another, the second material 72, located in the smaller end 36 interacts at the area of contact 50 with the first material 70 located in the larger end 34 of the adjacent bead thereby allowing an increased level of friction and greatly reducing the "squeaking." This embodiment provides the additional benefit of only requiring the manufacture of one type of bead 68 for a flexible arm assembly 20.

Any of the above-described embodiments can be utilized to create a flexible arm assembly 20, which simultaneously provides adjustable support for heavier objects while eliminating the annoying "squeaking" noises commonly encountered when using beads manufactured from the same materials.

In the embodiment shown in FIG. 1, the shower arm assembly 20 is about six inches in length. Most preferably, the amount of friction necessary between the external surface 46 of the smaller end 36 and the internal surface 48 of the larger end 34 of the beads within the shower arm 20 must be sufficient to support about a one-pound showerhead 22 with the center of gravity about one foot from the connection with the shower pipe 24. Other lengths and showerhead weights can be accommodated with the appropriate design parameters including materials, ball and socket clearances, and overmold surface design.

The entire flexible arm need not be made of the different beads as described herein. It is contemplated that only the beads at the location of the highest load need to be made according to the present invention.

The invention has been described in detail while making reference to specific embodiments thereof. However, since it is known that others skilled in the art will, upon learning of the invention, readily visualize yet other embodiments of the invention that are within the spirit and scope of the invention, it is not intended that the above description be taken as a limitation on the spirit and scope of this invention.

What is claimed is:

1. A flexible arm assembly comprising:
    a first bead having a first end, said first end having an external surface;
    a second bead having a second end, said second end having an opening defining an internal wall and adapted to receive said first end of said first bead; and
    an overmold surface disposed between said external surface of said first bead and said internal wall of said second bead thereby creating a friction relationship between said first bead and said second bead sufficient to maintain said flexible arm assembly in a fixed orientation.

2. The flexible arm assembly of claim 1, wherein said external surface of said first bead and said internal wall of said second bead are substantially spherical.

3. The flexible arm assembly of claim 1, wherein said overmold surface is disposed over said external surface of said first bead.

4. The flexible arm assembly of claim 1, wherein said overmold surface is disposed over said internal wall of said second bead.

5. The flexible arm assembly of claim 1, wherein said overmold surface is disposed over substantially the entire surface of said external surface of said first bead or said internal wall of said second bead.

6. The flexible arm assembly of claim 1, wherein said overmold surface is disposed over less than about 75% of said external surface of said first bead or said internal wall of said second bead.

7. The flexible arm assembly of claim 1, wherein said overmold surface is disposed over less than about 50% of said external surface of said first bead or said internal wall of said second bead.

8. The flexible arm assembly of claim 1, wherein said overmold surface comprises at least one strip.

9. The flexible arm assembly of claim 1, wherein said overmold surface further comprises at least one tab.

10. The flexible arm assembly of claim 1, wherein said first end of said first bead contacts said second end of said second bead at an area of contact and said overmold surface covers substantially all of said area of contact between said first end and said second end.

11. An interconnecting bead unit comprising:
    a first bead comprised of a first material; and
    a second bead comprised of a different second material movably connected to said first bead wherein said first bead and second bead further comprise a larger end having an opening defining a substantially spherical internal wall and a smaller end having a substantially spherical external surface adapted to mate with said internal wall of said larger end.

12. The interconnecting bead unit of claim 11, wherein at least two interconnecting bead units are interconnected to form a flexible arm assembly.

13. The interconnecting bead unit of claim 11 wherein said first material is a thermoplastic material and said second material is different from said first material.

14. The interconnecting bead unit of claim 11 wherein said first material and said second material are thermoplastics, said first and second materials differing in Shore A hardness value by at least five units.

15. The interconnecting bead unit of claim 11, wherein said first material and said second material are metals.

16. The interconnecting bead unit of claim 11, wherein said first material is a metal and said second material is a thermoplastic.

17. A bead for a flexible arm assembly, said bead comprising:
    a first end having an external surface, said first end being made from a first material; and
    a second end having a recess adapted to receive said first end of said first bead, said second end being made from a different second material.

18. The bead claimed in claim 17, wherein a plurality of said beads are interconnected to form an interconnecting bead structure.

19. The bead claimed in claim 17, wherein said internal wall is a substantially spherical internal wall.

20. The bead of claim 17 wherein said first material is a thermoplastic material and said second material is different from said first material.

21. The bead of claim 17 wherein said first material and said second material are thermoplastics, said first and second materials differing in Shore A hardness value by at least five units.

22. The bead of claim 17, wherein said first material and said second material are metals.

* * * * *